United States Patent Office 3,586,579
Patented June 22, 1971

3,586,579
APPARATUS FOR FORMING TEARING TAPE PIECES ON A WEB OF PACKAGING FILM TO BE USED IN SUCCESSIVELY FORMING INDIVIDUAL TUBULAR PACKAGES
Seiichi Kawakami, Suzuka-shi, Japan, assignor to Asahi Dow Limited, Tokyo, Japan
Filed Nov. 21, 1968, Ser. No. 777,794
Claims priority, application Japan, Jan. 25, 1968, 43/3,967
Int. Cl. B32b 31/00
U.S. Cl. 156—380
4 Claims

ABSTRACT OF THE DISCLOSURE

Tape pieces formed on individual tubular packages of semi-fluid or viscous products as film tearing means should be fully solid with the casing film particularly in cases where the film is of tough material. According to the invention, such tape pieces can be formed on the packaging film integrally therewith by high-frequency or heat welding before the film is shaped into tubular form and filled with the material to be packaged.

---

The present invention relates generally to automatic packaging processes including the successive steps of feeding a web of packaging film while shaping it into tubular form, sealing together the adjoining longitudinal edges of the film to form a continuous tube, directing the material to be packaged into said tube of film, constricting said film tube at regular intervals as by wire means and severing said film tube thus constricted into individual packages by appropriate cutter means. The present invention is effectively applicable to such processes, including an area where a web of packaging film proceeds in an continuous fashion, and has for its object to provide a novel method of attaching tape pieces to packages of the type described which serve as an effective means for opening the package. Another object of the present invention is to provide an apparatus for carrying out such method with efficiency.

One form of previously known automatic packaging machines that include an area or region where a web of packaging film proceeds in a continuous fashion is disclosed in the U.S. Pat. No. 2,831,302 and known in Japan under the trade name of "ADP" (Asahi-Dow Co., Ltd.). This form of machine is in wide use in packaging foods such as sausage, ham, "tofu" (bean-curds), and "yokan" (sweet jelly of beans), principally utilizing the vinylidene-chloride type copolymer film such as known by the trade name of Saran.

However, the vinylidene-chloride type copolymer film is tough and tear-resistant and packages formed of such film are generally hard to open unless an appropriate opening tool such as a sharp metallic cutter is used.

To meet this situation, it has previously been proposed to employ on such kind of packages film-tearing or opening means in the form of a tape piece that extends, for example, along the inside of the packaging film transversely thereof or along the outside of the film longitudinally or transversely thereof.

At the present state of art, however, such tape pieces, if simply attached to the packaging film with an adhesive agent alone, cannot be united with the film solidly enough to be used effectively to break the vinylidene-chloride copolymer film casing of the package and must be formed of a film material that is weldable to the type of packaging film and welded thereto in an integral and inseparable manner, for example, by high-frequency or heat welding.

Moreover, such type of welding procedure cannot be employed for attaching tape pieces to the packaging film after it has been filled with the material to be packaged and naturally the packaging process must be performed in a sequence including such welding stage prior to the shaping of the packaging film into tubular form and subsequent filling of the material to be packaged.

Under these circumstances, the present invention is intended to provide a method of and an apparatus for welding a tearing tape of film onto a continuously travelling web of packaging film at regular intervals and severing the tearing tape into welded pieces to be carried one on each of packages completed.

These and other objects, features and advantages of the invention will become apparent from the following description when taken in conjunction with the accompanying drawings, which illustrate a preferred embodiment of the invention and in which.

Figure 1:
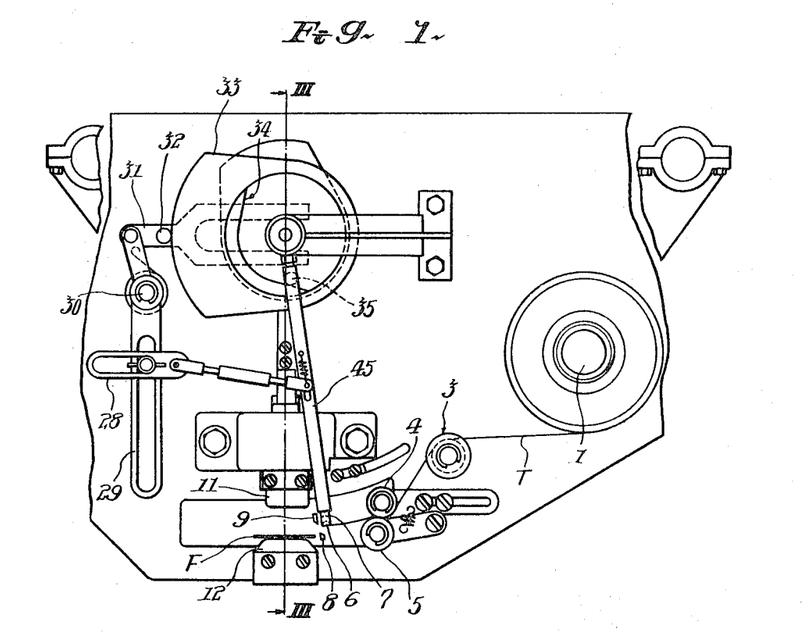
FIGS. 1 and 2 are a plan and a front view, respectively, of the apparatus.
Figure 2:
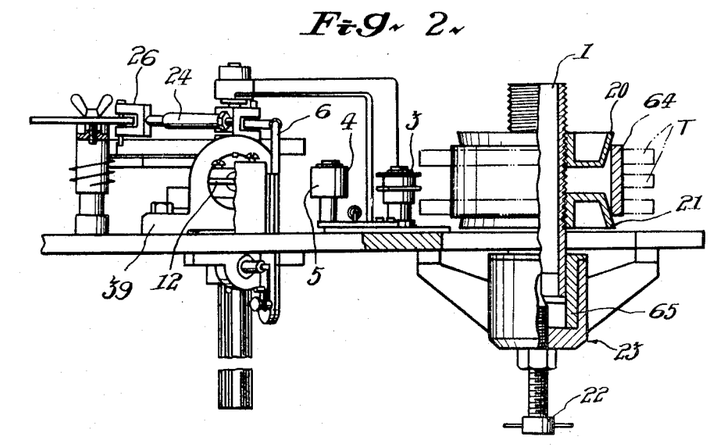
Figure 3:
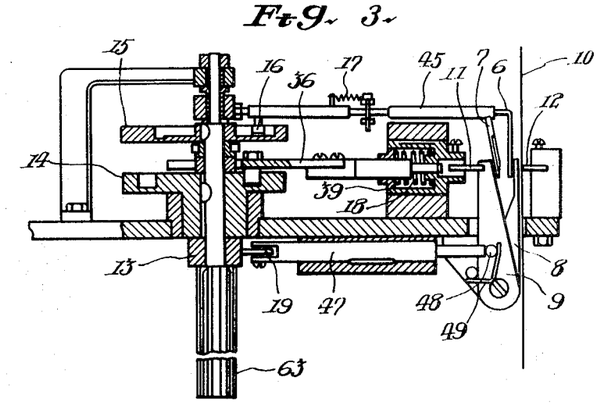
FIG. 3 is a cross-sectional view taken substantially along the line III—III in FIG. 1.

Referring to the drawings and first to FIGS. 1 and 2, a tape bobbin 64 carries thereon one or more rolls of film tape T of limited width and usable as a material for tearing tape pieces and includes bobbin hubs 20 and 21 by means of which the bobbin is mounted on a vertical shaft 1, which in turn is fitted in a bearing bracket 23. An adjusting rod 22 is threadably mounted on the bearing bracket 23 and engaged at the inner end with the bobbin shaft 1 in such a manner that the latter is movable vertically or axially thereof to enable use of the film rolls on the bobbin 64 in the order of their arrangement or in any other order desired.

The bobbin shaft 1 is journaled in a bearing member 65 fitted in the bearing bracket 23 and is freely rotatable as the film tape T is drawn from the roll in use. A tape guide roll 3 is provided to prevent the film tape T as released from the bobbin 64 from being deflected in a vertical direction during its travel and to serve the purpose effectively has its peripheral contacting surface crowned or raised along the medial line circumferential thereof.

A pair of direction control rolls 4 and 5 are cooperable to keep the tape T clamped therebetween at a location close to its forward end so that the tape is at all times directed to be readily engaged by a tape feeder, including a feeder bar 45 and grip fingers 6 and 7 carried thereon, notwithstanding the fact that the tape is cut down in each cycle of machine operation by a length required for a single package, as will be described below in detail.

The tape feeder bar 45 is pivoted at its top for lateral oscillatory movement and, when swung from right to left with the forward end of the film tape held between the grip fingers 6 and 7, draws out the tape T through the direction control rolls 4 and 5. The tape is released at the end of the leftward swing of the feeder bar 45, which is then swung back to the right and again holding the tape between the grip fingers 6 and 7, repeats its tape drawing motion described above.

The film tape T is thus fed onto the packaging film F separately fed between movable and stationary electrodes 11, 12 and then immediately pressed against the surface of the packaging film F under the action of movable electrode 11 and welded to the film surface as the electrodes are fed with high-frequency current.

Subsequently, the welded tape end portion is severed by cutter means 8 and 9 to remain on the packaging film as a film-tearing piece T' integral with the packaging film.

The construction and operation of the apparatus described above will next be explained in more detail with reference to FIGS. 4 to 8.

Figure 4:
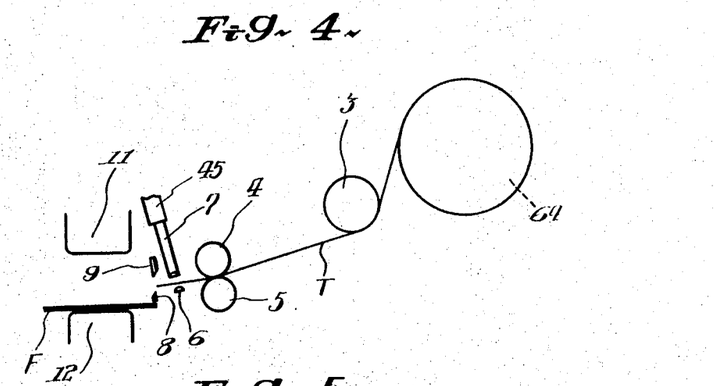
FIGS. 4 to 8 are schematic illustrations showing the eessential parts of the apparatus in different phases of operation.
Figure 5:
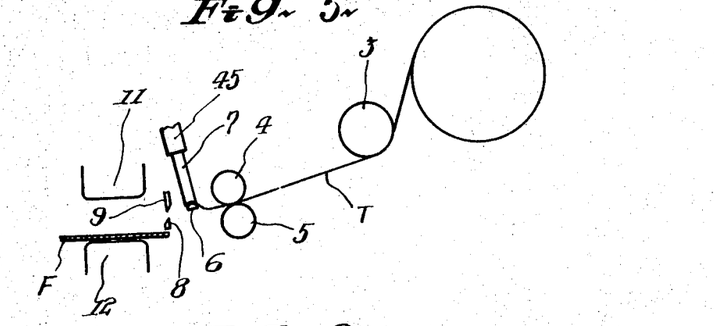
Figure 6:
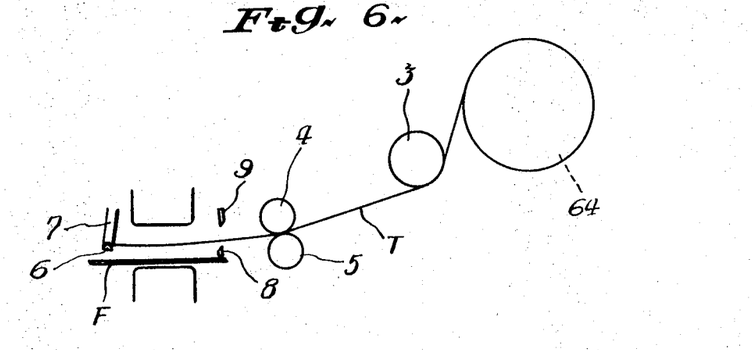
Figure 7:
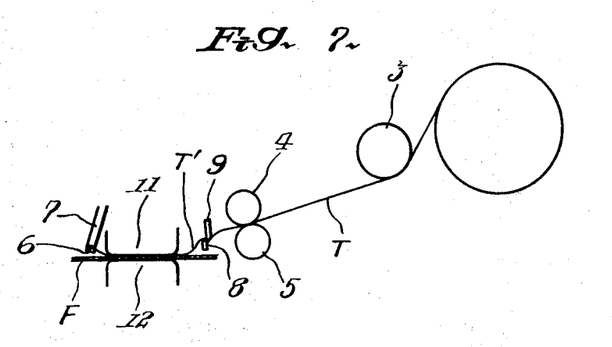
Figure 8:
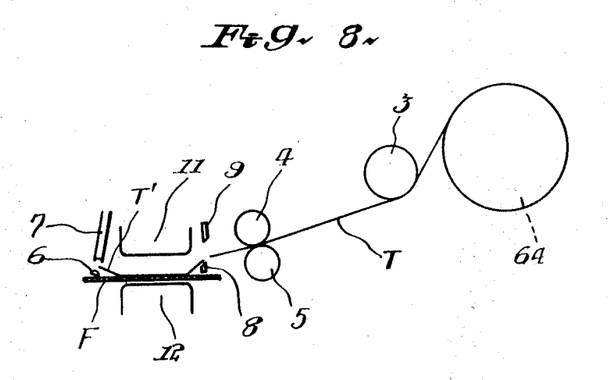

FIGS. 4 and 5 illustrate the manner in which the grip fingers 6 and 7 on the tape feeder bar 45 cooperate to clamp the forward end of the film tape T which extends from between the direction control tools 4 and 5. The film tape thus clamped is subsequently drawn forward by a predetermined length as the grip fingers move leftward, as shown in FIG. 6, and thus fed onto the web of packaging film F transversely thereof. Then, as shown in FIG. 7, movable electrode 11 is moved to press the film tape T and packaging film F against the stationary electrode 12 and weld the film materials to each other under a supply of high-frequency current through the electrodes. Briefly thereafter the tape cutter operates, its movable blade 9 being actuated to cooperate with stationary blade 8 to cut the tape T at a point close to the rear end of the welded tape portion T', which is left on the packaging film F to serve as a film tearing piece on a finished package. Subsequently, the electrode 11, grip finger 7 on the tape feeder bar 45 and movable cutter blade 9 of the tape cutter are restored to their respective open positions shown in FIG. 4, ready to repeat the operation described above.

Figure 20:
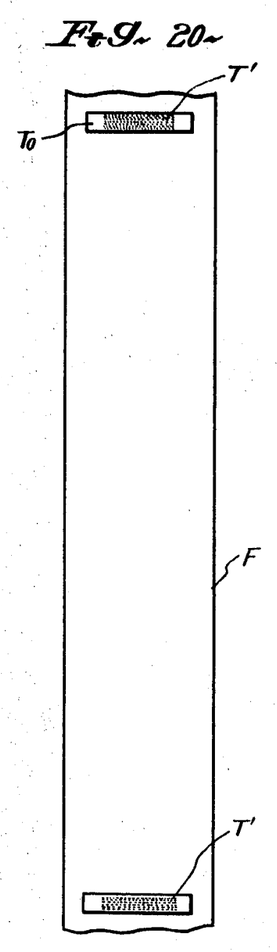
FIG. 20 is a plan view showing the casing film F carrying tearing tape pieces T' welded thereto.
Figure 21:
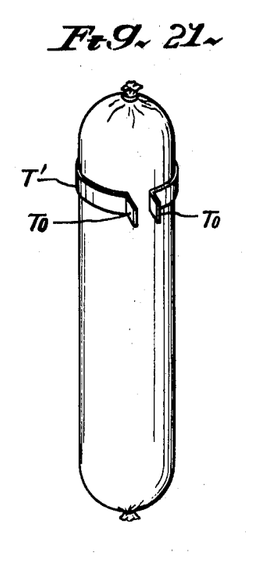
FIG. 21 illustrates a package formed with the film shown in FIG. 20.
Figure 22:
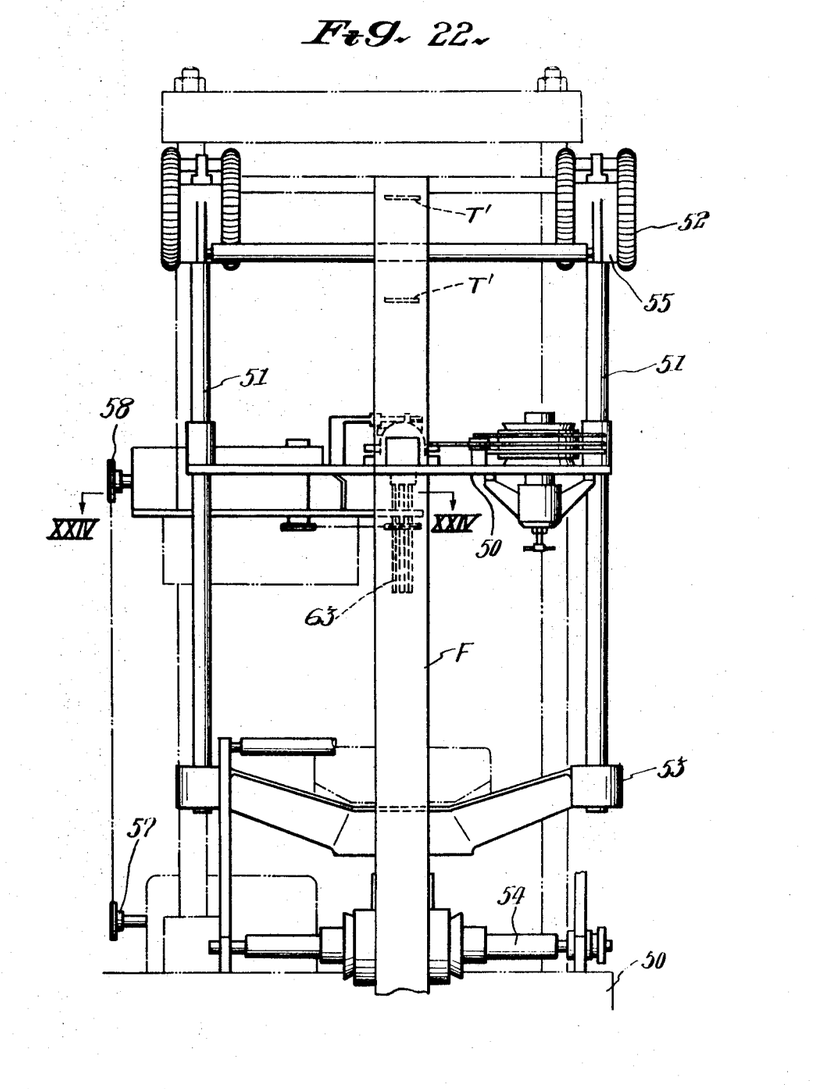
FIG. 22 is a front view of a conventional type of automatic packaging machine, showing an application of the invention.

It is to be noted that the welding and cutting of the film tape T fed between the electrodes 11 and 12 should be done in such a manner that the piece of tape T', remaining on the packaging film F, includes at least at one end of the welded area a free tab or finger grip portion not welded to the film F, as indicated at To in FIGS. 20 and 21.

It is to be noted at this point that the web of packaging film F continues to travel through the machine travel while being formed thereon with tearing tape pieces T' at regular intervals as described.

Figure 9:
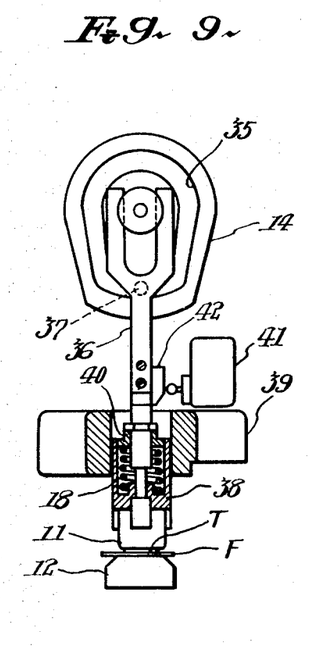
FIG. 9 is a side elevation, partly in section, of the welding station when a tearing tape is being welded to the web of packaging film.
Figure 10:
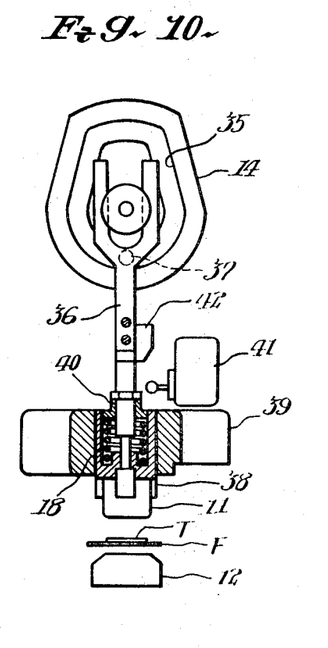
FIG. 10 is a view similar to FIG. 9 showing the state when the welding has been completed and the electrodes opened.

FIGS. 9 and 10 illustrate the high-frequency heat-welding mechanism of the machine which includes a drive rod 36 carrying an electrode support 38 on which movable electrode 11 is mounted. The drive rod 36 also carries a follower pin 37 which is slidably fitted in a cam groove 35 formed in a rotary cam 14. The electrode support 38 is slidably fitted in a guide member 39 and upon rotation of the cam 14 is driven to move up and down carrying the movable electrode 11 between the positions shown in FIGS. 9 and 10.

Mounted also on the drive rod 36 is a switch tripper 42 which operates a microswitch 41 so as to alternately energize and de-energize the high-frequency circuit including electrodes 11 and 12.

A compression spring 18 is arranged between the drive rod 36 and the electrode support 38 and the pressure of movable electrode 11, which it exerts upon the stationary one 12, can be controlled by turning an adjusting nut 40 in one direction or other, which is threadably engaged on the drive rod, to impart a desired initial compression to the spring 18.

Figure 11:
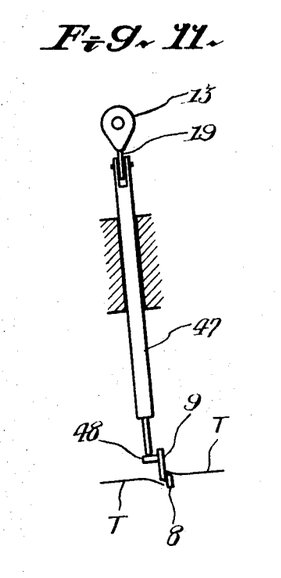
FIG. 11 illustrates the state of the cutting device when the tape welded has been cut.
Figure 12:
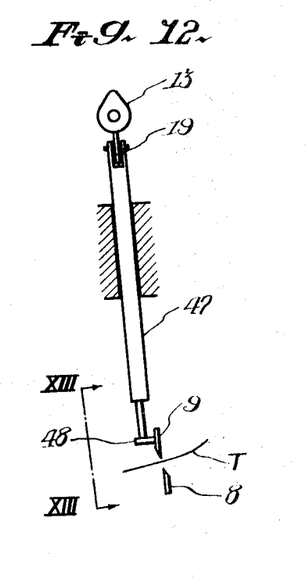
FIG. 12 illustrates the cutter in open position it assumes at the end of the tape cutting.
Figure 13:
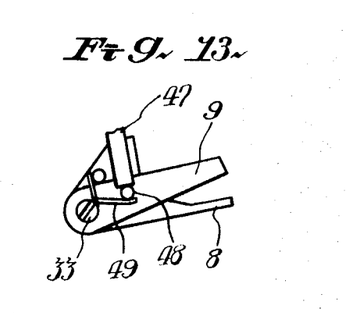
FIG. 13 is a view showing the cutter structure looking in the direction of the arrows of the line XIII-XIII in FIG. 12.
Figure 14:
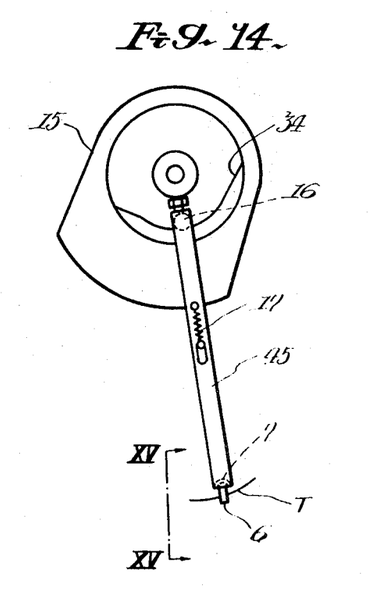
FIG. 14 is a view showing the tape feeder bar with its grip fingers in open position.

Operation of the tape cutter mechanism, including cutter blades 8 and 9, will next be described with reference to FIGS. 11 to 13. FIG. 11 illustrates the mechanism in closed position it assumes when the cutter blades have cut the tear tape T at a point adjacent to its forward end and FIG. 12 illustrates the mechanism in its position with the cutter blades subsequently opened. The cutter structure per se is shown in detail in FIG. 13, which represents a view looking in the direction of the arrows of the line XIII—XIII in FIG. 12.

Movable cutter blade 9 carries a projection 48 and is rockable about the axis of a pivot 33, on which the blade is mounted, as a cam element 13 is rotated to actuate a push bar 47 axially thereof, which carries a cam follower 19 at one of its ends and is held at the other end in pressure contact with projection 48. A wire spring 49 is provided to urge the movable blade 9 into its normal or open position by way of the projection 48 on the blade.

Figure 15:
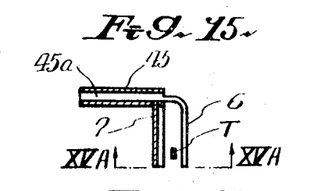
FIG. 15 is a fragmentary view showing the grip fingers in detail looking in the direction of the arrows of the line XV—XV in FIG. 15.
Figure 15A:
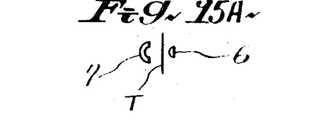
FIG. 15A is a plan view taken along the line XVA—XVA in FIG. 15.
Figure 16:
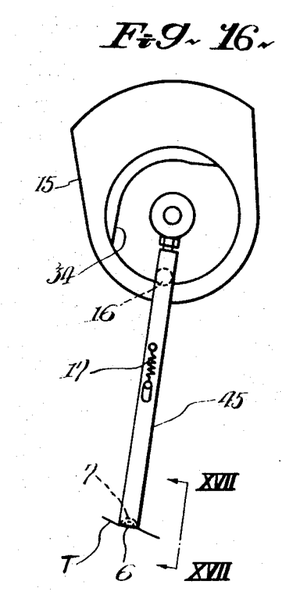
FIG. 16 is a view similar to FIG. 14 showing the grip fingers in closed position.
Figure 17:
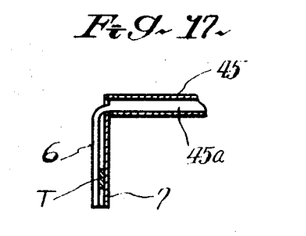
FIG. 17 is a fragmentary detail view of the fingers looking in the direction of the arrows of the line XVII—XVII in FIG. 16.

Operation of the tape feeder mechanism will next be described with reference to FIGS. 14 to 17. The mechanism includes a feeder bar which is comprised of a hollow rod 45 and a solid rod 45a slidably fitted therein. Tape holder fingers 6 and 7 are formed on the respective rods 45a and 45 at one end thereof and cooperate to firmly grip the tape T. To this end, one of the grip fingers 7 is normally biased into engagement with the other finger 6 under the action of a tension spring 17 arranged between the hollow and solid rods 45 and 45a. A cam member 15 is provided which carries an internal camming surface 34, which acts, upon rotation of the cam member 15, to move the grip finger 7 apart from grip finger 6 thereby to release the film tape T previously held between the fingers, as shown in FIGS. 15 and 15A.

Figure 18:
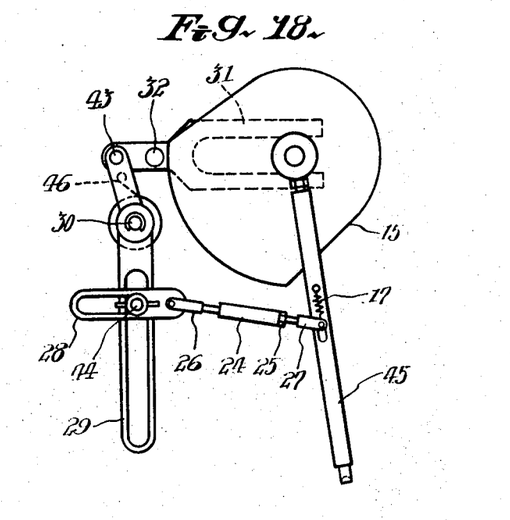
FIG. 18 is a view showing the tape feeder mechanism in the state it assumes before starting tape feeding.
Figure 19:
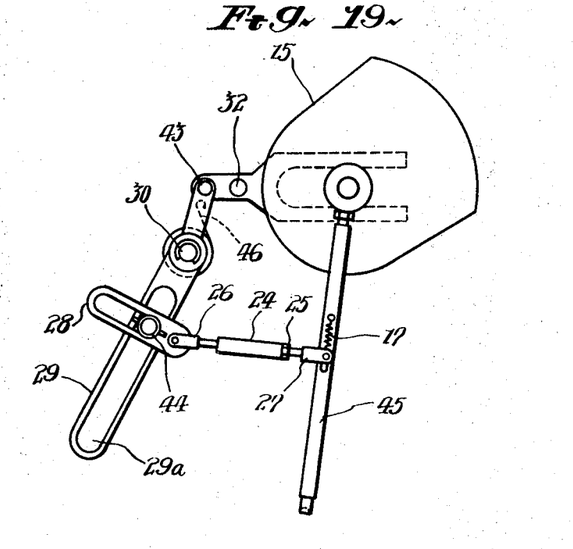
FIG. 19 is a view similar to FIG. 18 showing the mechanism in the state it assumes when the tape has been fed.

FIGS. 18 and 19 illustrate a mechanism for importing lattral oscillatory movement to the tape feeder bar 45–45a. In this mechanism, as cam 15 is driven to rotate, a follower yoke 31 which carries a follower pin 32 in contact with the peripheral camming surface of cam 15 is moved right and left and simultaneously a lever arm 29, pivoted to the yoke by pin means 43, laterally oscillates about the axis of a pivot 30, on which the lever arm is mounted. The oscillation of the lever arm 29 causes lateral swinging motion to the tape feeder bar 45–45a by way of a slider 28, connecting rods 26, 27 and an adjusting nut 24. A spring 46 is arranged to hold the follower pin 32 at all times in pressure contact with cam 15, thereby to provide a force as required to feed the film tape T. The lever arm 29 is formed with a guide groove 29a and, by loosening a wing nut 44, provided to clamp the slider 28 to the lever arm, the slider 28 can be shifted on the arm as required to impart to the tape feeder bar 45–45a a range of motion corresponding to the desired length of tape feed. By this means, the length of tearing tape pieces T' to be formed on the packaging film F can be selected as desired to suit the width of the film F. When the amount of tape feed is varied, the angular range of swing of the tape feeder bar 45–45a naturally varies in spatial position. The provision of adjusting nut 24 makes it easy to accommodate this situation as it serves as a turnbuckle threadably receiving the ends of the connecting rods 26 and 27 carring right- and left-handed threads, respectively.

According to the present invention, the film tape T of limited width, being fed from bobbin 64 onto the web of packaging film F, is caused to move laterally in the direction of the film travel at a speed equal to that of the film F or at a speed in the range suitable for the tape welding and cutting operation as effected by the arrangement including a high-frequency device for welding the tape T onto the surface of the web of film F and means for cutting the tape into predetermined lengths each including a welded area. In other words, all the processes, including the steps of laying the film tape T on the web of packaging film F, pressing the tape T and film web together against the stationary electrode 12 by means of movable electrode 11, and joining the tape T integrally with the film web F by high-frequency welding, is carried out while the tape is moving laterally together with the web of packaging film in the direction longitudinal thereof.

To this end, the welding apparatus of the present invention is arranged relative to the path of travelling web of packaging film F so that the latter slides over the surface of stationary electrode 12. In other words, the apparatus is mounted on a base or casing adapted to effect an appropriate reciprocatory motion to cause the apparatus to proceed in a direction parallel to the path of film F at a speed equal to that of the film F or at a speed in the range suitable for the welding of the film tape T to the surface of the packaging film F and then restore the initial, normal position. It is important to cause the welder device and the web of packaging film F to proceed in parallel to each other at least while the web and the film tape T are being clamped between the electrodes 11 and 12.

An application of such welding device to a previously known form of automatic packaging machine will next be described with reference to FIGS. 23 and 24.

The tape welding device described above is mounted on a base or platform 50 through which slide bars 51 extend vertically. The slide bars 51 are fixed to and interconnected by a slide support 53 and are supported at the top by means including slide guides 55 and balancers 52.

Figure 23:
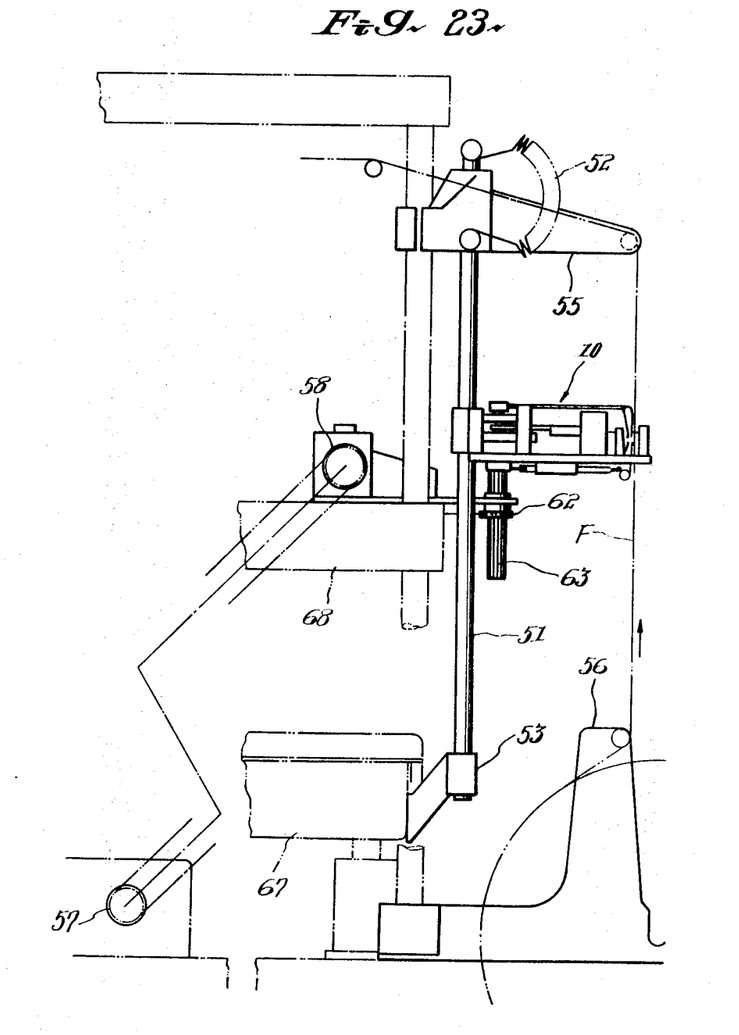
FIGS. 23 and 24 are fragmentary illustrations of the machine drawn to explain of its operation.
Figure 24:
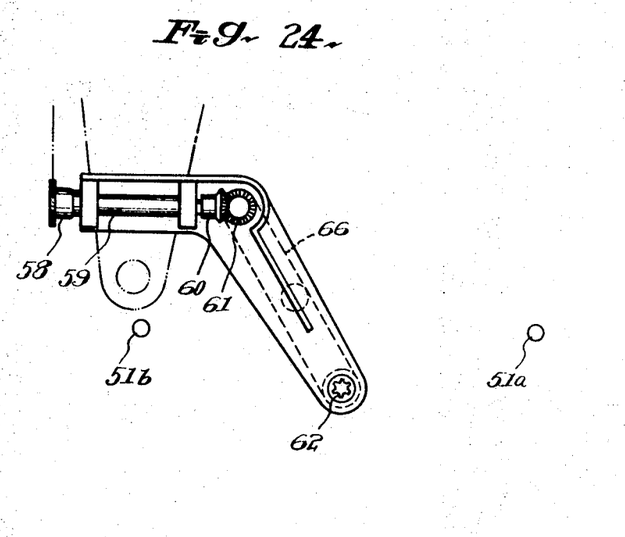

The tape welder, generally indicated by 10 in FIG. 23, includes a main drive shaft 63 which is driven from a take-off shaft provided on the continuous type packaging machine and carrying a drive sprocket 57, which drives a sprocket 58 mounted on an intermediate shaft 59, which in turn drives a sprocket chain 66 by way of bevel gears 60 and 61. The chain 66 is in driving engagement with a splined sprocket 62 mounted on the welded shaft 63.

A web of packaging film F is fed around a film shaft 54, which is mounted on the film support 56 of the automatic packaging machine, and proceeds upwardly in a continuous manner. The rising and falling movement of the tape welder 10 parallel to the path of film web F is obtained by utilizing the reciprocating movement of constricting mechanism 67 in the packaging machine, which is driven to advance and retract in parallel to the path of packaging film F substantially at the same speed as that of film F during each cycle of machine operation. In other words, the slide support 53 is fixed to the constricting mechanism 67 to cause the welding device 10 as a whole to effect rising and falling motion together with the constricting mechanism 67. Thus, in operation of the automatic packaging machine, in which the web of packaging film proceeds vertically upward in a continuous fashion, the tape welder 10 being mounted on slide bars 51 fixed to the slide support 53 is caused to rise and fall together with the constricting mechanism 67, once for each package produced.

On the other hand, the main shaft 63 of the tape welder 10 is driven to rotate with splined sprocket 62, which is driven from drive sprocket 57 by way of sprocket 58, bevels 60 and 61 and chain 66. Such rotation of the welder shaft 63 is effected so as to make one revolution during each cycle of vertical reciprocation of the welder 10. In each such cycle, the tape feeder bar 45 of the welder, clamping the forward end of film tape T between its grip fingers 6 and 7, carries the tape forward by a predetermined distance; subsequently the movable electrode 11 operates to place the tape T thus fed onto the travelling web of film F and press the tape and film web thus superimposed against stationary electrode 12 to weld them together by a high-frequency current directed across the electrodes 11 and 12; the cutter 8–9 acts at the same time to sever the film tape T, leaving an end grip or grips T$o$ on the cut piece of tape on the web of packaging film F; and finally the tape feeder bar 45 is swung to the right to clamp the fresh end of the film tape T in preparation for the next feed stroke.

The adjustment of the tape welder 10 to enable the welding and cutting operation described above to be performed while the web of packaging film F is travelling can be readily effected by varying the height or level of the tape welder 10 relative to the splined sprocket 62.

The web of packaging film F passing through the welding device 10 and now carrying tape pieces T' thereon at regular intervals is subjected in further stations to various known processes; that is, the web is shaped into tubular form, filled with material to be packaged, constricted at predetermined intervals, and finally cut in the constricted areas to form individual packages, each of which carries a single film-tearing tape piece T' welded integrally to the film casing, as shown in FIG. 21.

Though a preferred embodiment of the invention has been shown and described herein, it will be apparent to those skilled in the art that various changes and modifications may be made without departing from the spirit and scope of the invention as defined in the appended claims.

What is claimed is:

1. An apparatus for forming tearing film tape pieces on a continuously traveling web of packing film at regular intervals and at right angles to the longitudinal axis of the film web wherein said apparatus comprises means for controlling a direction of the film tape as sent out from a tape bobbin 1, a movable electrode and a stationary electrode movable to operatively associated positions for supplying a high frequency electric current to press together the film tape and the film web and to weld them together, cutters 8, 9 operable to sever the film tape between said direction controlling means and the electrodes, and feeding means for moving the film tape over the film web to cross the same in the space between said two electrodes when inoperative by gripping a forward end portion of the film tape, said feeding means comprising a swingable bar crossing a grip end thereof into the space of between said electrodes, the swingable bar including rods 45 and 45a slidably associated with each other, said rolls being provided at their extreme ends with respective grip fingers 7 and 6 cooperable to grip the film tape therebetween, and cam means 34 for controlling the axial position of said rods relative to each other and hence a space between the grip fingers.

2. An apparatus as in claim 1 comprising means positioning said apparatus for forming tearing film tape pieces on a continuously traveling web of packing film, and drive means operatively engaging said positioning means to reciprocate the same to move it in one direction longitudinally with and parallel to said web in timed relation to the operation of said electrodes.

3. An apparatus for forming tearing film tape pieces on a continuously traveling web of packing film at regular intervals and at right angles to the longitudinal axis of the film web wherein said apparatus comprises a pair of rollers 4, 5 for controlling a direction of the film tape as sent out from a tape bobbin 1, a movable electrode and a stationary electrode for supplying a high frequency electric current to press together the film tape and the film web and to weld them together, cutters 8, 9 operable to sever the film tape on the film web crossing the film tape sent from the direction controlling rollers 4, 5 into the space occupied between said two electrodes by gripping a forward end portion of the film tape, said feeding means comprising a swingable bar crossing a grip end thereof into the space of between said electrodes, the swingable bar including a hollow rod 45 and a solid rod 45a slidably fitted therein, said rods being provided at their extreme ends with respective grip fingers 7 and 6 cooperable to grip the film tape therebetween and cam means 34 for controlling the axial position of said rods relative to each other and hence a space between the grip fingers.

4. An apparatus as in claim 1 comprising means positioning said apparatus for forming tearing film tape pieces on a continuously traveling web of packing film, drive means operatively engaging said positioning means to reciprocate the same to move it in one direction longitudinally with and parallel to said web in timed relation to the operation of said electrodes, and said drive means operatively engaging and driving said cam means and operatively engaging said movable electrode to control the position thereof.

References Cited

UNITED STATES PATENTS

| | | | |
|---|---|---|---|
| 835,176 | 11/1906 | Burgard | 156—526 |
| 1,158,637 | 11/1915 | Chorvath | 294—103 |
| 1,534,530 | 4/1925 | Kuziel | 156—517 |
| 1,953,681 | 4/1934 | Johnson | 294—103 |
| 2,988,129 | 6/1961 | Kevelin et al. | 156—380 |
| 3,159,100 | 12/1964 | Marquiss | 198—27 |

BENJAMIN A. BORCHELT, Primary Examiner

R. E. HART, Assistant Examiner

U.S. Cl. X.R.

156—250